(12) United States Patent
Seidemann et al.

(10) Patent No.: US 8,038,950 B2
(45) Date of Patent: Oct. 18, 2011

(54) FLUIDIZED-BED REACTOR FOR CARRYING OUT A GAS-PHASE REACTION

(75) Inventors: Lothar Seidemann, Brussels (BE);
Dieter Stuetzer, Dudenhofen (DE);
Thomas Grassler, Limburgerhof (DE);
Martin Karches, Neustadt (DE);
Christian Schneider, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 268 days.

(21) Appl. No.: 12/441,982

(22) PCT Filed: Sep. 14, 2007

(86) PCT No.: PCT/EP2007/059702
§ 371 (c)(1),
(2), (4) Date: Mar. 19, 2009

(87) PCT Pub. No.: WO2008/034769
PCT Pub. Date: Mar. 27, 2008

(65) Prior Publication Data
US 2010/0021354 A1 Jan. 28, 2010

(30) Foreign Application Priority Data
Sep. 19, 2006 (EP) .................................. 06120884

(51) Int. Cl.
*B01J 8/18* (2006.01)
*F27B 15/00* (2006.01)
(52) U.S. Cl. ..................... 422/143; 422/139; 422/140
(58) Field of Classification Search .............. 422/139, 422/140, 143
See application file for complete search history.

(56) References Cited

U.S. PATENT DOCUMENTS

| 3,429,654 | A | * | 2/1969 | Friedrichsen et al. | 549/249 |
|---|---|---|---|---|---|
| 4,430,302 | A | * | 2/1984 | Krause | 422/144 |
| 4,493,735 | A | * | 1/1985 | Flaschel et al. | 134/25.1 |
| 5,073,236 | A | | 12/1991 | Gelbein et al. | |
| 6,146,519 | A | | 11/2000 | Koves | |
| 2002/0112988 | A1 | | 8/2002 | Mauleon et al. | |
| 2005/0249648 | A1 | | 11/2005 | Kehrer et al. | |

FOREIGN PATENT DOCUMENTS

| DE | 102 26 120 | 12/2003 |
|---|---|---|
| EP | 0 428 265 | 5/1991 |
| EP | 1 477 224 | 11/2004 |

OTHER PUBLICATIONS

Jin, et al.: Handbook of Fluidization and Fluid Particle Systems, Marcel Dekker-Verlag, New York—Basel, 2003, pp. 175-199.

* cited by examiner

*Primary Examiner* — Walter Griffin
*Assistant Examiner* — Lessanework Seifu
(74) *Attorney, Agent, or Firm* — Oblon, Spivak, McClelland, Maier & Neustadt, L.L.P.

(57) ABSTRACT

A fluidized-bed reactor for carrying out a gas-phase reaction, in which a gaseous reaction mixture flows from the bottom upward through a heterogeneous particulate catalyst forming a fluidized bed and internals are arranged in the fluidized bed, wherein the internals divide the fluidized bed into a plurality of cells arranged horizontally in the fluidized-bed reactor and a plurality of cells arranged vertically in the fluidized-bed reactor, with the cells having cell walls which are permeable to gas and have openings which ensure an exchange number of the heterogeneous particulate catalyst in the vertical direction in the range from 1 to 100 liters/hour per liter of reactor volume, is proposed.

20 Claims, 2 Drawing Sheets

FLUIDIZED-BED REACTOR FOR CARRYING OUT A GAS-PHASE REACTION

Figure 1:
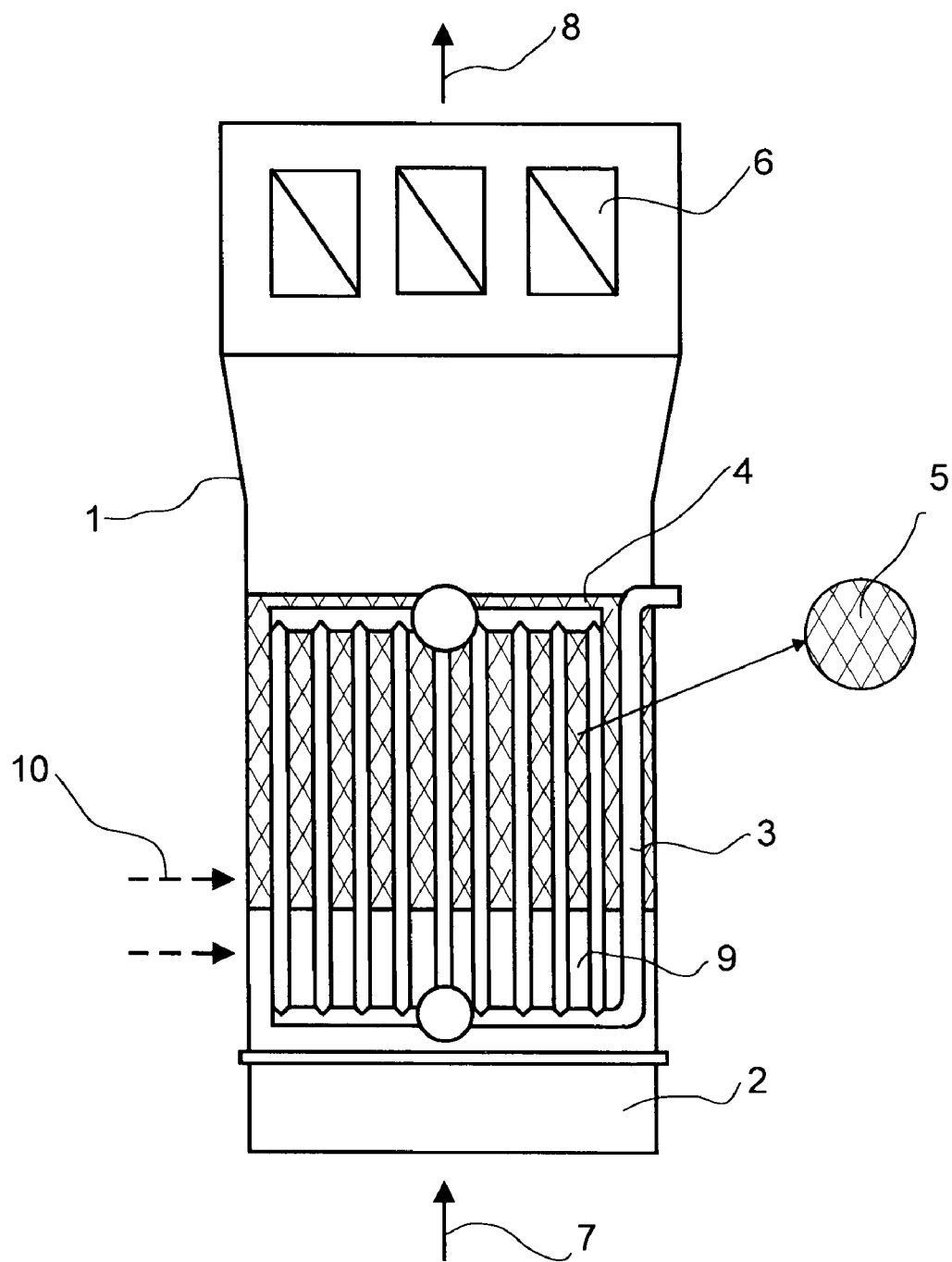

This application is a 371 of PCT/EP07/59702 filed Sep. 14, 2007.

The invention relates to a fluidized-bed reactor for carrying out a gas-phase reaction, in which a gaseous reaction mixture flows from the bottom upward through a heterogeneous particulate catalyst forming a fluidized bed and internals are arranged in the fluidized bed.

Fluidized-bed reactors are used in a known manner for carrying out gas-phase reactions in which one or more gaseous starting materials are passed, with or without addition of inert carrier gas, from the bottom upward through a bed of a heterogeneous particulate catalyst which is very finely divided and is kept suspended as a fluidized bed by the gas. Solid particles having a mean diameter in the range from 1 to 1000 µm, in particular from 1 to 500 µm or from 1 to 200 µm, are frequently used.

A characteristic of a fluidized bed is that the gas forms bubbles as a result of the limited distance between the solid particles. Fluidized-bed reactors are suitable in a known manner for, in particular, carrying out exothermic or endothermic reactions having a large heat of reaction, since very good heat transfer properties are ensured because of the excellent solids mixing resulting from the fluidized catalyst particles.

In fluidized-bed reactors, the residence time of the gas phase, the mass transfer and the heat transfer are determined by the state of fluidization which depends on the flow velocity of the gas phase and the solids properties of the fluidized-bed catalyst.

However, fluidized-bed reactors have disadvantages in terms of mass transfer, since contact between catalyst and reactants is limited due to the formation of gas bubbles in which little solid is present.

Fluidized-bed reactors are found to be particularly disadvantageous for carrying out reactions in which the residence time is critical and unselective reactions. Owing to the convective solids backmixing in the fluidized bed, the product formed can react further in the inlet zone of the fluidized-bed reactor to form by-products and subsequent products, with correspondingly adverse effects on yield and selectivity.

A large number of internals in the fluidized bed and their effects on the properties of fluidized-bed reactors have therefore been examined. An overview is provided, for example, in Handbook of Fluidization and Fluid Particle Systems, Marcel Dekker-Verlag, New York-Basel, 2003, pages 175-199.

The internals can be, for example, tubes which are placed in the fluidized bed in order to reduce the size of gas bubbles and the convective solids backmixing. The tubes can be aligned either vertically or horizontally, with the spacing of the tubes having to be smaller than the mean size of the gas bubbles. Disadvantages here are the high occupation of the cross-sectional area of the reactor and the resulting increased demixing and discharge tendency of the fluidized-bed catalyst.

Dividing plates can likewise be aligned horizontally or vertically. However, at relatively high gas velocities which are indispensable for economical loading of the reactor, horizontal arrangement of dividing plates results in formation of gas cushions which greatly impair heat transfer (cf. the above-cited handbook, page 190, FIGS. 15a to d in conjunction with the description on pages 190 to 191, left-hand column). In particular, the lower zones in the fluidized bed can also become depleted in solid catalyst as a result of the increased occupation of the cross-sectional area, so that a significant deterioration in heat transfer has to be taken into account.

Vertical internals, for example vertical rows of tubes, also have disadvantages; in particular, these cannot produce a reduction in the bubble size which is sufficient for many applications.

An improvement in the residence time properties and the mass transfer can also be achieved by means of regular or irregular beds of packing in the fluidized bed. The mass transfer can be improved and the residence time distribution optimized in the narrow interstices between the shaped bodies forming the bed of packing. However, here too, the higher occupation of the cross section by the bed of packing is found to be disadvantageous in respect of increased demixing and discharge tendency of the catalyst.

In the light of this, it was an object of the invention to achieve a further improvement in a fluidized-bed reactor having internals, in particular in respect of the residence time properties, with the solid residing locally for significantly longer, namely about 2 powers of ten or more longer compared to the gas flow, and with the above disadvantages being avoided.

The fluidized-bed reactor having internals should also be able to be used, in particular, for carrying out processes on an industrial scale.

The object is achieved by a fluidized-bed reactor for carrying out a gas-phase reaction, in which a gaseous reaction mixture flows from the bottom upward through a heterogeneous, particulate catalyst forming a fluidized bed and internals are arranged in the fluidized bed, wherein the internals divide the fluidized bed into a plurality of cells arranged horizontally in the fluidized-bed reactor and a plurality of cells arranged vertically in the fluidized-bed reactor, with the cells having cell walls which are permeable to gas and have openings which ensure an exchange number of the heterogeneous particulate catalyst in the vertical direction in the range from 1 to 100 liters/hour per liter of reactor volume. The exchange number in the horizontal direction can also advantageously be in the range from 0 to 100 liters/hour per liter of reactor volume.

It has been found that it is important to divide the fluidized bed into cells, i.e. hollow spaces enclosed by cell walls, by means of internals both in the horizontal direction and in the vertical direction, with the cell walls being permeable to gas and having openings which allow solids exchange in the vertical direction in the fluidized-bed reactor. Furthermore, the cell walls can be provided with openings which allow solids exchange in the horizontal direction. The heterogeneous particulate catalyst can thus move in the vertical direction and possibly also in the horizontal direction through the fluidized-bed reactor, but is held back in the individual cells compared to a fluidized bed without these, with the above-defined exchange numbers being ensured.

The exchange number is determined by the use of radioactively labeled solid tracer particles which are introduced into the fluidized reaction system, as described, for example, in: G. Reed "Radioisotope techniques for problem-solving in industrial process plants", Chapter 9 ("Measurement of residence times and residence-time distribution"), p. 112-137, (J. S. Chariton, ed.), Leonard Hill, Glasgow and London 1986, (ISBN 0-249-44171-3). Recording of the time and location of these radioactively labeled particles enables the solids motion to be determined locally and the exchange number to be derived (G. Reed in: "Radioisotope techniques for problem-solving in industrial process plants", Chapter 11 ("Miscellaneous radiotracer applications", 11.1. "Mixing and blending studies"), p. 167-176, (J. S. Charlton, ed.), Leonard Hill, Glasgow and London 1986, (ISBN 0-249-44171-3).

Targeted selection of the geometry of the cells enables the residence time of the heterogeneous particulate catalyst in these to be matched to the characteristics of the reaction to be carried out in the particular case.

The series arrangement of a plurality of cells, i.e., in particular from 0 to 100 cells or else from 10 to 50 cells, per meter of bed height, i.e. in the vertical direction in the direction of gas flow from the bottom upward through the reactor, limits backmixing and thus improves the selectivity and the conversion. The additional arrangement of a plurality of cells, i.e. from 10 to 100 cells or else from 10 to 50 cells, per meter in the horizontal direction in the fluidized-bed reactor, i.e. cells through which the reaction mixture flows in parallel or in series, allows the capacity of the reactor to be matched to requirements. The capacity of the reactor of the invention is thus essentially not limited and can be matched to specific requirements, for example for reactions on an industrial scale.

As a result of the cells enclosing hollow spaces which accommodate the particulate heterogeneous catalyst, the cell material itself takes up only a limited part of the cross section of the fluidized-bed reactor, in particular only from about 1 to 10% of the cross-sectional area of the fluidized-bed reactor, and therefore does not lead to the disadvantages associated with increased occupation of the cross section which are known in the case of the internals from the prior art.

The fluidized-bed reactor of the invention is, as is customary, supplied with the gaseous starting materials from the bottom via a gas distributor. On passing through the reaction zone, the gaseous starting materials are partially reacted over the heterogeneous particulate catalyst which is fluidized by the gas flow. The partially reacted starting materials flow into the next cell where they undergo a further partial reaction.

Above the reaction zone, there is a solids separation device which separates the entrained catalyst from the gas phase. The reacted product leaves the fluidized-bed reactor according to the invention at its upper end in solids-free form.

In addition, the fluidized-bed reactor of the invention can be additionally supplied with liquid starting materials either from the bottom or from the side. However, these have to be able to vaporize immediately at the point where they are introduced in order to ensure the fluidizability of the catalyst.

The geometry of the cells is not restricted; the cells can be, for example, cells having round walls, in particular hollow spheres, or cells having angular walls. If the walls are angular, the cells preferably have no more than 50 corners, preferably no more than 30 corners and in particular no more than 10 corners.

The cell walls in the cells of the internals are permeable to gas so as to ensure fluidization of the heterogeneous particulate catalyst as a result of flow of the gas phase through the cells. For this purpose, the cell walls can be made of a woven mesh or else of sheet-like materials which have, for example, round holes or holes of another shape.

Here, the mean mesh opening of the woven meshes used or the preferred width of the holes in the cell walls is, in particular, from 50 to 1 mm, more preferably from 10 to 1 mm and particularly preferably from 5 to 1 mm.

As internals in the fluidized bed, particular preference is given to using cross-channel packings, i.e. packings having creased gas-permeable metal sheets, expanded metal sheets or woven meshes which are arranged in parallel to one another in the vertical direction in the fluidized bed and have creases which form flat areas between the creases having an angle of inclination to the vertical which is different from zero, with the flat areas between the creases of successive metal sheets, expanded metal sheets or woven meshes having the same angle of inclination but with the opposite sign so as to form cells which are delimited in the vertical direction by constrictions between the creases.

Examples of cross-channel packings are the packings of the types Mellpack®, CY or BX from Sulzer AG, CH-8404 Winterthur, or the types A3, BSH, B1 or M from Monz GmbH, D-40723 Hilden.

In the cross-channel packings, hollow spaces, i.e. cells, delimited by constrictions between the creases are formed in the vertical direction between two successive metal sheets, expanded metal sheets or woven meshes as a result of the creased structure of these.

The mean hydraulic diameter of the cells, determined by means of the radioactive tracer technique which is, for example, described above in the reference cited in connection with the determination of the exchange number, is preferably in the range from 500 to 1 mm, more preferably from 100 to 5 mm and particularly preferably from 50 to 5 mm.

Here, the hydraulic diameter is defined in a known manner as four times the horizontal cross-sectional area of the cell divided by the circumference of the cell viewed from above.

The mean height of the cells, measured in the vertical direction in the fluidized-bed reactor by means of the radioactive tracer technique, is preferably from 100 to 1 mm, more preferably from 100 to 3 mm and particularly preferably from 40 to 5 mm.

The above cross-channel packings occupy only a small part of the cross-sectional area of the fluidized-bed reactor, in particular a proportion of from about 1 to 10% of this.

The angles of inclination to the vertical of the flat areas between the creases are preferably in the range from 10 to 80°, in particular from 20 to 70°, particularly preferably from 30 to 60°.

The flat areas between the creases in the metal sheets, expanded metal sheets or woven meshes preferably have a crease height in the range from 100 to 3 mm, particularly preferably from 40 to 5 mm, and a spacing of the constrictions between the creases in the range from 50 to 2 mm, particularly preferably from 20 to 3 mm.

In order to achieve targeted control of the reaction temperature, heat exchangers can be installed in the internals forming the cells for the purpose of introducing heat in the case of endothermic reactions or removing heat in the case of exothermic reactions. The heat exchangers can, for example, be configured in the form of plates or tubes and be arranged vertically, horizontally or in an inclined fashion in the fluidized-bed reactor.

The heat transfer areas can be matched to the specific reaction; in this way, any reaction can be implemented in heat engineering terms by means of the reactor concept according to the invention.

The internals forming the cells are preferably made of materials having a very good thermal conductivity so that heat transport via the cell walls is not hindered. The heat transfer properties of the reactor according to the invention thus correspond to those of a conventional fluidized-bed reactor.

The materials for the internals forming the cells should also have a sufficient stability under reaction conditions; in particular, not only the resistance to chemical and thermal stresses but also the resistance of the material to mechanical attack by the fluidized catalyst have to be taken into account.

Owing to the ease of working them, metal, ceramic, polymers or glass materials are particularly useful.

The internals are preferably configured so that they divide from 10 to 90% by volume of the fluidized bed into cells.

As a result of the limited occupation of the cross section by the internals forming the cells, the reactor according to the invention does not have any disadvantages in respect of demixing and discharge tendency of the fluidized particulate catalyst.

The fluidized-bed reactor of the invention is suitable for, in particular, carrying out the following reactions: hydrogenations, in particular Fischer-Tropsch reactions, preparation of cyclohexene/cyclohexane from benzene, ammonia-free hydrogenation of nitriles, tetrahydrofuran, BDO from maleic anhydride or benzene from methane, for dehydrogenations, for example the preparation of ethene from ethane, propene from propane, butene from butane, styrene from ethylbenzene or dodecene from dodecane, partial oxidations, for example maleic anhydride from n-butane or raffinate II, phthalic anhydride from naphthalene or ortho-xylene, acrolein or acrylic acid from propene or propane, nicotinic acid from beta-picoline, glyoxal from ethylene glycol, acetic acid from ethanol, formaldehyde from methanol, formic acid from methanol or acetic acid from ethane, epoxidations, in particular of ethene to form ethylene oxide, ammonoxidations, in particular for preparing acrylonitrile from propene, methacrylonitrile from isobutane or phthalonitrile from xylene, and also further reactions, in particular the preparation of vinyl acetate from acetylene and acetic acid, chlorination of methane, reaction of phenol and methanol to form cresol and 2,6-xylenol, methanol to gasoline, metathesis of 1-butene to form 1-dodecene or the preparation of melamine from urea.

The invention is illustrated below with the aid of a drawing.
In the drawing:
FIG. 1 schematically shows a preferred embodiment of a fluidized-bed reactor according to the invention, and
FIG. 2 schematically shows a preferred embodiment of internals according to the invention.

The fluidized-bed reactor 1 shown in FIG. 1 comprises a solids-free gas distributor zone 2, internals 3 which form cells 4 and a heat exchanger 5 in the region of the internals 3.

Above the reaction zone, the reactor widens and has at least one solids separator 6. The arrow 7 indicates the introduction of the gaseous starting materials and the arrow 8 indicates the discharge of the gaseous product stream. Additional liquid-phase starting materials can be introduced at the side, via the broken-line arrows 9.

Figure 2:
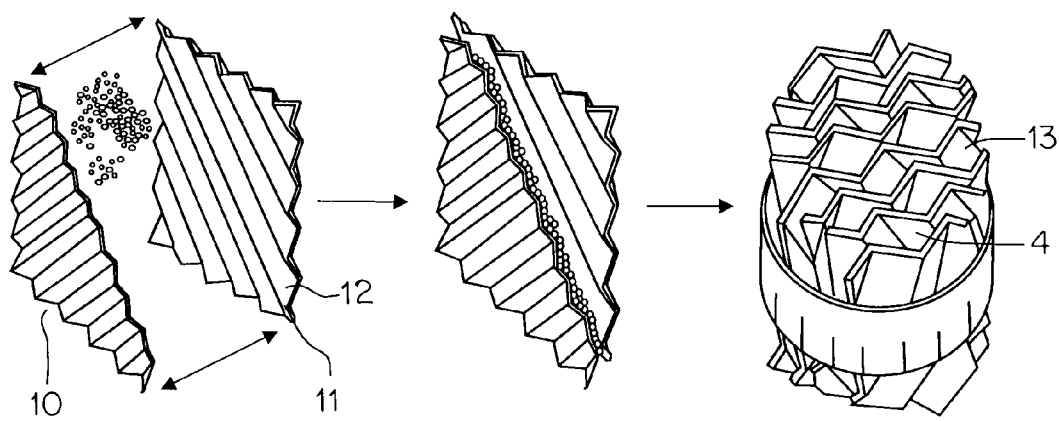

FIG. 2 shows a preferred embodiment of internals 3 according to the invention in the form of a cross-channel packing having creased metal sheets 10 which are arranged parallel to one another in the longitudinal direction and have creases 11 which divide the metal sheet 10 into flat areas 12 between the creases, with two successive metal sheets being arranged so that they have the same angle of inclination but with the opposite sign and thus form cells 4 which are delimited in the vertical direction by constrictions 13.

The invention claimed is:

1. A fluidized-bed reactor adapted for carrying out a gas-phase reaction, in which a gaseous reaction mixture flows from the bottom upward through a heterogeneous particulate catalyst forming a fluidized bed and internals are arranged in the fluidized bed, wherein the internals divide the fluidized bed into a plurality of cells arranged horizontally in the fluidized-bed reactor and a plurality of cells arranged vertically in the fluidized-bed reactor, with the cells having cell walls which are permeable to gas and have openings which ensure an exchange number of the heterogeneous particulate catalyst in the vertical direction in the range from 1 to 100 liters/hour per liter of reactor volume, wherein the internals are configured as cross-channel packing having creased gas-permeable metal sheets, expanded metal sheets or woven meshes which are arranged in parallel to one another in the vertical direction in the fluidized-bed reactor and have creases which form flat areas between the creases having an angle of inclination to the vertical which is different from zero, with the flat areas between the creases of successive metal sheets, expanded metal sheets or woven meshes having the same angle of inclination but with the opposite sign so as to form cells which are delimited in the vertical direction by constrictions between the creases.

2. The fluidized-bed reactor according to claim 1, wherein the openings in the cell walls of the cells arranged in the fluidized-bed reactor ensure an exchange number of the heterogeneous particulate catalyst in the horizontal direction in the region of 100 liters/hour per liter of reactor volume.

3. The fluidized-bed reactor according to claim 1, wherein the openings in the cell walls of the cells arranged in the fluidized-bed reactor ensure an exchange number of the heterogeneous particulate catalyst in the vertical direction in the range from 10 to 50 liters/hour per liter of reactor volume and in the horizontal direction of zero or from 10 to 50 liters/hour per liter of reactor volume.

4. The fluidized-bed reactor according to claim 1, wherein the angle of inclination to the vertical of the flat areas between the creases is in the range from 10 to 80°.

5. The fluidized-bed reactor according to claim 1, wherein the cells of the internals have a hydraulic diameter measured by means of the radioactive tracer technique of from 100 to 5 mm.

6. The fluidized-bed reactor according to claim 1, wherein the cells of the internals have a mean height measured in the vertical direction in the fluidized-bed reactor by means of the radioactive tracer technique of from 100 to 3 mm.

7. The fluidized-bed reactor according to claim 5, wherein the cells of the internals have a mean height measured in the vertical direction in the fluidized-bed reactor by means of the radioactive tracer technique of from 100 to 3 mm.

8. The fluidized-bed reactor according to claim 1, wherein the flat areas between the creases in the metal sheets, expanded metal sheets or woven meshes have a crease height in the range from 100 to 3 mm, and the spacing of the constrictions between the creases is in the range from 50 to 2 mm.

9. The fluidized-bed reactor according to claim 5, wherein the flat areas between the creases in the metal sheets, expanded metal sheets or woven meshes have a crease height in the range from 100 to 3 mm, and the spacing of the constrictions between the creases is in the range from 50 to 2 mm.

10. The fluidized-bed reactor according to claim 6, wherein the flat areas between the creases in the metal sheets, expanded metal sheets or woven meshes have a crease height in the range from 100 to 3 mm, and the spacing of the constrictions between the creases is in the range from 50 to 2 mm.

11. The fluidized-bed reactor according to claim 1, wherein heat exchangers are present in the internals.

12. The fluidized-bed reactor according to claim 11, wherein the heat exchangers are configured in the form of plates or tubes.

13. The fluidized-bed reactor according to claim 1, wherein the internals are made of metal, ceramic, polymer or glass materials.

14. The fluidized-bed reactor according to claim 4, wherein the angle of inclination to the vertical of the flat areas between the creases is in the range from 20 to 70°.

15. The fluidized-bed reactor according to claim 4, wherein the angle of inclination to the vertical of the flat areas between the creases is in the range from 30 to 60°.

16. The fluidized-bed reactor according to claim 1, wherein the cells of the internals have a hydraulic diameter measured by means of the radioactive tracer technique of from 50 to 5 mm.

17. The fluidized-bed reactor according to claim 1, wherein the cells of the internals have a mean height measured in the vertical direction in the fluidized-bed reactor by means of the radioactive tracer technique of from 40 to 5 mm.

18. The fluidized-bed reactor according to claim 1, wherein the flat areas between the creases in the metal sheets, expanded metal sheets or woven meshes have a crease height in the range from 40 to 5 mm, and the spacing of the constrictions between the creases is in the range from 20 to 3 mm.

19. The fluidized-bed reactor according to claim 5, wherein the flat areas between the creases in the metal sheets, expanded metal sheets or woven meshes have a crease height in the range from 40 to 5 mm, and the spacing of the constrictions between the creases is in the range from 20 to 3 mm.

20. The fluidized-bed reactor according to claim 6, wherein the flat areas between the creases in the metal sheets, expanded metal sheets or woven meshes have a crease height in the range from 40 to 5 mm, and the spacing of the constrictions between the creases is in the range from 20 to 3 mm.

* * * * *